US012762467B2

(12) United States Patent
Acharya et al.

(10) Patent No.: US 12,762,467 B2
(45) Date of Patent: Oct. 13, 2026

(54) METHODS AND SYSTEMS FOR POLYMERIC FINGERPRINT ANALYSIS AND IDENTIFICATION

(71) Applicant: UL LLC, Northbrook, IL (US)

(72) Inventors: Saurav Acharya, Naperville, IL (US); Shubhankar Mitra, Chicago, IL (US); Karan Sodhi, Laramie, WY (US); Rashid Mehdiyev, Lake Forest, IL (US); Dermot Cochran, Bray (IE); Annie Ibrahim-Rana, Dublin (IE); Ray Andrick, Pittsburgh, PA (US)

(73) Assignee: UL LLC, Northbrook, IL (US)

( * ) Notice: Subject to any disclaimer, the term of this patent is extended or adjusted under 35 U.S.C. 154(b) by 1050 days.

(21) Appl. No.: 17/819,552

(22) Filed: Aug. 12, 2022

(65) Prior Publication Data

US 2024/0054388 A1 Feb. 15, 2024

(51) Int. Cl.

| | |
|---|---|
| ***G01N 21/3563*** | (2014.01) |
| ***G06F 18/22*** | (2023.01) |
| ***G06F 18/40*** | (2023.01) |
| ***G06N 20/00*** | (2019.01) |

(52) U.S. Cl.

CPC ......... *G06N 20/00* (2019.01); *G01N 21/3563* (2013.01); *G06F 18/22* (2023.01); *G06F 18/40* (2023.01)

(58) Field of Classification Search

CPC .... G01N 21/3563; G06N 20/00; G06F 18/22; G06F 18/40

See application file for complete search history.

(56) References Cited

U.S. PATENT DOCUMENTS 5,510,619 A * 4/1996 Zachmann ......... G01N 21/3563 250/339.08
7,271,388 B2 * 9/2007 Riess ................. G01N 21/3563 250/341.8
9,165,843 B2 10/2015 Chen et al.
10,546,237 B2 1/2020 Heifets et al.
10,578,550 B2 3/2020 Hoult et al.
10,955,362 B2 * 3/2021 Guzman Cardozo .. G01N 21/95

(Continued)

OTHER PUBLICATIONS

Polymer ID Analyzer, PerkinElmer, https://www.perinelmer.com/product/spectrum-two-polymer-id-analyzer-l160001j, dated Feb. 17, 2022, 2 pgs.

*Primary Examiner* — Beau D Spratt
(74) *Attorney, Agent, or Firm* — Greenberg Traurig, LLP

(57) ABSTRACT

An example method includes receiving training data for training of a machine learning model. The training data includes a plurality of pairs of datasets. Each of the pairs of datasets includes a reference dataset and a sample dataset. The reference dataset is indicative of first results of a first plastic sample analysis and the sample dataset is indicative of second results of a second plastic sample analysis. Each of the pairs of datasets further includes an indication, for each of the pairs of datasets, that features of the sample dataset and the reference dataset are a match. The method further includes training a machine learning model based on the training data to determine matches between datasets. The method further includes receiving a new sample dataset. The method further includes determining, using the trained machine learning model, that the new sample dataset matches another dataset.

19 Claims, 10 Drawing Sheets

(56) References Cited

U.S. PATENT DOCUMENTS

| | | | | |
|---|---|---|---|---|
| 11,898,963 | B2 * | 2/2024 | Pruneri | G06N 3/08 |
| 11,969,764 | B2 * | 4/2024 | Kumar | B07C 5/3422 |
| 2015/0309502 | A1 | 10/2015 | Breitgand et al. | |
| 2019/0265319 | A1 * | 8/2019 | Zhang | A61B 5/05 |
| 2022/0198711 | A1 * | 6/2022 | Mayer | G06T 7/33 |
| 2023/0120940 | A1 * | 4/2023 | Qiu | G06F 40/284 704/245 |

* cited by examiner

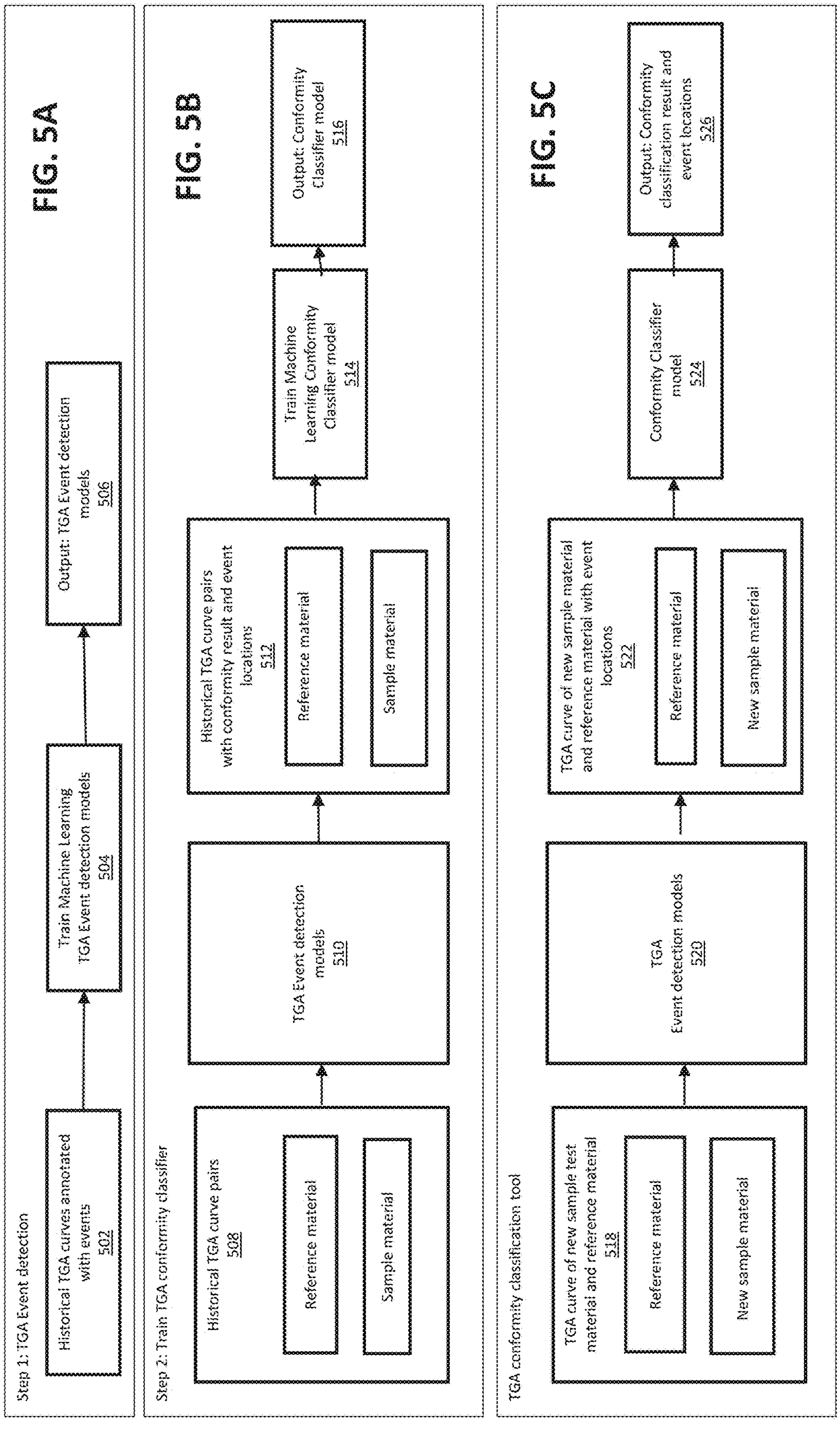
Step 1: TGA Event detection
Historical TGA curves annotated with events 502
Train Machine Learning TGA Event detection models 504
Output: TGA Event detection models 506
FIG. 5A
Step 2: Train TGA conformity classifier
Historical TGA curve pairs 508
Reference material
Sample material
TGA Event detection models 510
Historical TGA curve pairs with conformity result and event locations 512
Reference material
Sample material
Train Machine Learning Conformity Classifier model 514
Output: Conformity Classifier model 516
FIG. 5B
TGA conformity classification tool
TGA curve of new sample test material and reference material 518
Reference material
New sample material
TGA Event detection models 520
TGA curve of new sample material and reference material with event locations 522
Reference material
New sample material
Conformity Classifier model 524
Output: Conformity classification result and event locations 526
FIG. 5C

METHODS AND SYSTEMS FOR POLYMERIC FINGERPRINT ANALYSIS AND IDENTIFICATION

BACKGROUND

Polymers, such as plastics, may be evaluated and analyzed using various tests and analyses. For example, polymers, such as plastics, may be analyzed using flammability tests, mechanical strength tests, etc. Other processes may be performed on a sample to analyze the chemical or other properties of a plastic. For example, thermogravimetric (TGA) analyses, differential scanning calorimetry (DSC) analyses, and/or infrared spectroscopy (IR) analyses may be used as identification analyses to measure inherent properties of a polymer, such as a plastic. The results of those analyses may therefore be used to identify a type of polymer, such as a plastic, as a polymer sample of the same type, because, for example, they may have similar TGA, DSC, and IR analyses results. In this way, a polymer sample may be identified as being the same as a previously analyzed sample based on the results of such prior analyses, for example, by a trained chemist skilled at comparing results of analyses such as TGA, DSC, and IR.

SUMMARY

Described herein are various systems, methods, computer readable media, and apparatuses for training and using machine learning models to analyze and determine matches between polymer sample analysis results with analysis results previously acquired from other samples. Once the machine learning models are trained to recognize matching polymer sample analysis results, the models may be used to determine when an analyzed sample is a same type of polymer as a previously analyzed sample. This may be valuable, for example, in a material testing program where it is desirable to determine if a new polymer sample is the same type of polymer as a previously analyzed sample.

In various embodiments, the present disclosure further provides an exemplary technically improved computer-based method that includes at least receiving, by one or more processors of one or more computing devices, training data for training of a machine learning model. The training data includes a plurality of pairs of datasets. Each of the pairs of datasets includes a reference dataset and a sample dataset. The reference dataset is indicative of first results of a first plastic sample analysis and the sample dataset is indicative of second results of a second plastic sample analysis. Each of the pairs of datasets further includes an indication, for each of the pairs of datasets, that features of the sample dataset and the reference dataset are a match. The method further includes training, by the one or more processors, a machine learning model based on the training data to determine matches between datasets. The method further includes receiving, by the one or more processors, a new sample dataset. The method further includes determining, by the one or more processors using the trained machine learning model, that the new sample dataset matches at least one of a new reference dataset, one of the reference datasets of the plurality of pairs of datasets in the training data, or one of the sample datasets of the plurality of pairs of datasets in the training data.

In various embodiments, the present disclosure provides an exemplary technically improved computer-based system that includes at least the following components of a memory and at least one processor coupled to the memory. The processor is configured to store, on the memory, a trained machine learning model. The trained machine learning model was trained with training data. The training data includes a plurality of pairs of datasets. Each of the pairs of datasets includes a reference dataset and a sample dataset. The reference dataset is indicative of first results of a first plastic sample analysis and the sample dataset is indicative of second results of a second plastic sample analysis. Each of the pairs of datasets further includes an indication, for each of the pairs of datasets, that features of the sample dataset and the reference dataset are a match. The processor is further configured to receive a new sample dataset. The processor is further configured to determine, based on the trained machine learning model, that the new sample dataset matches at least one of a new reference dataset, one of the reference datasets of the plurality of pairs of datasets in the training data, or one of the sample datasets of the plurality of pairs of datasets in the training data In some embodiments, the present disclosure provides an exemplary technically improved non-transitory computer readable medium having instructions stored thereon that, upon execution by a computing device, cause the computing device to perform operations including receiving a dataset. The dataset includes a plurality of data pairs. Each of the data pairs includes reference data and sample data. The reference data is indicative of first results of a first plastic sample analysis. The sample data is indicative of second results of a second plastic sample analysis. The dataset further includes, an indication, for each of the data pairs, that features of the sample data and the reference data are a match. The instructions further cause the computing device to perform operations including training a machine learning model using the dataset. The instructions further cause the computing device to perform operations including receiving new sample data. The instructions further cause the computing device to perform operations including determining, using the trained machine learning model, that the new sample data matches at least one of new reference data, one of the reference data of the plurality of data pairs in the dataset, or one of the sample data of the plurality of data pairs in the dataset.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein, including in the various drawings and figures, are not to be interpreted as limiting, but merely as a representative basis for teaching one skilled in the art to variously employ one or more illustrative embodiments.

FIGS. 5A-5C are flowcharts illustrating processes for training and using machine learning models to determine matches between curves generated using a thermogravimetric (TGA) analysis for reference and new sample materials in accordance with one or more embodiments of the present disclosure.

DETAILED DESCRIPTION

Figure 1:
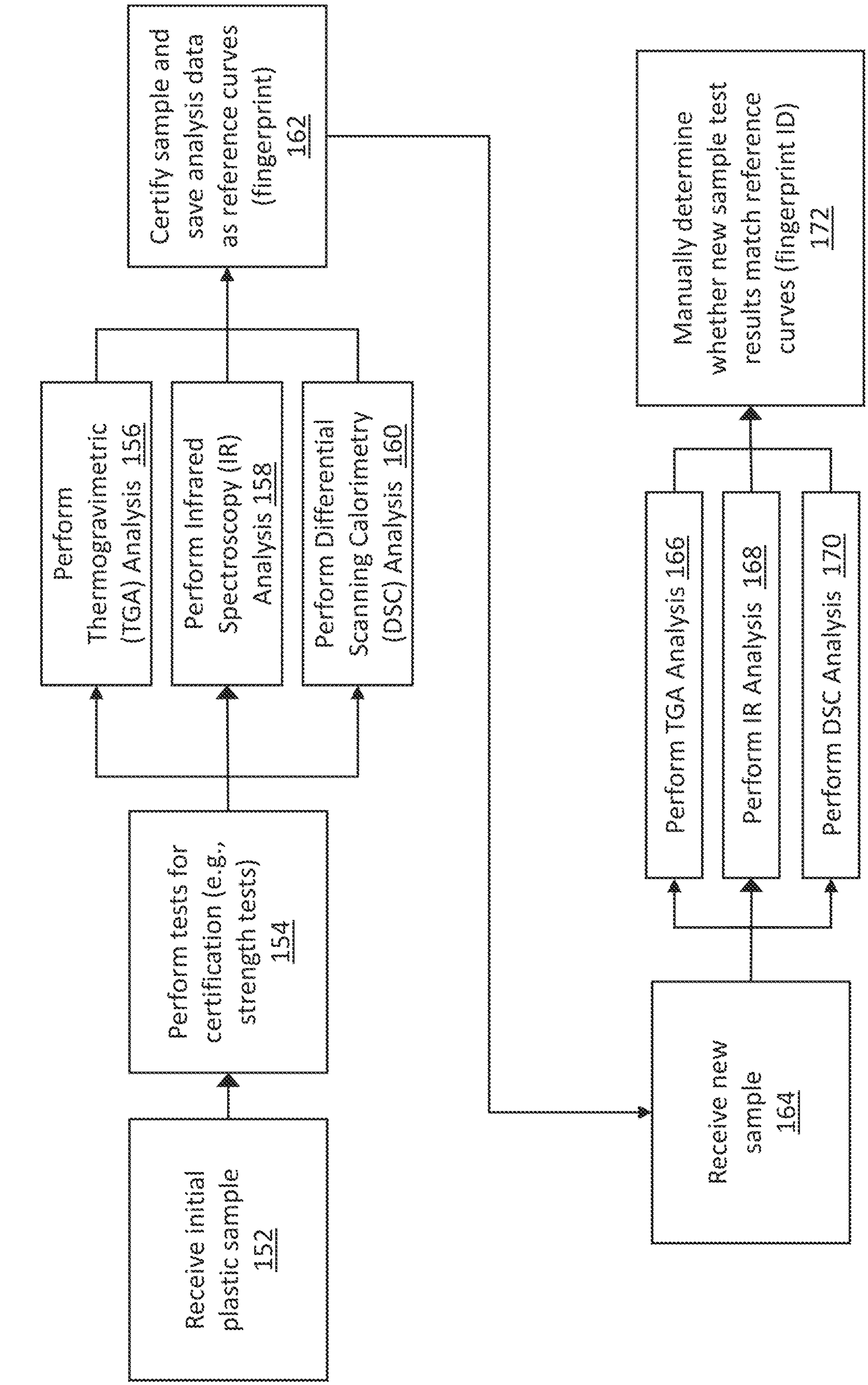
FIG. 1 is a diagram illustrating a process for testing and analyzing plastic samples in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Described herein are methods, systems, computer readable media, etc. for training a machine learning model to match previous product analysis data performed (e.g., on a polymer sample) to new polymer sample analysis data. Since manufacturers of polymer goods, such as plastics, often update their products or release new versions of products, those manufacturers may desire to have the new or updated products tested, analyzed, and/or certified. By matching a new sample to a sample previously analyzed, a testing entity may be able to confidently certify that the polymer in the new or updated product is the same or substantially the same as the polymer (or other material) used in the previous product that was tested, analyzed, and/or certified. In doing so, the new or updated product may be tested, analyzed and/or certified more efficiently, more accurately, etc. based on matching the new or updated product to an older, previously analyzed product. Various embodiments herein include training a machine learning model to predict or determine such matches between new product samples and previously analyzed samples using datasets related to specific analyses performed on the products. Those datasets related to a particular product may be referred to herein as a fingerprint of the product, polymer, or plastic. As such, the various embodiments described herein provide for comparing the fingerprints of two polymer samples to determine if they match, even if the tester or testing entity does not know the actual chemical composition of either product—instead the fingerprint may be representative of how the products reacted to certain chemical, heat, etc. tests. For example, analyses performed on plastics may include thermogravimetric (TGA) analyses, differential scanning calorimetry (DSC) analyses, and/or infrared spectroscopy (IR) analyses. In various embodiments, other tests or analyses may be used and other types of materials than plastics may be analyzed using the various methods, apparatuses, computer readable media, and systems described herein. For example, the various embodiments herein may be used to analyze other polymers, whether natural or synthetic, including thermoplastics, thermosets, and/or elastomers.

Where a fingerprint match is identified, the testing entity may be able to omit other additional tests that may be more arduous or time consuming, such as physical performance tests. In other words, if a plastic product sample is determined to be the same or substantially the same plastic as a previously performance analyzed sample, those performance tests may be omitted (e.g., in a certification for the new plastic product sample, or for any other reason it is desirable to match a previously analyzed sample to a new sample). The embodiments described herein may, therefore, provide cost savings and time savings to the entity submitting the samples and to the testing entity. The embodiments described herein represent a significant improvement over methods where each sample to be matched to a previous sample is subjected to a full range of analyses and manually matched each time a product made out of a similar plastic is to be analyzed. In addition, where a manufacturer believes that the plastic in a new product is the same as the plastic in a previous product, the manufacturer may also identify the previous product that has already been analyzed. Then, a reference product used to determine a fingerprint match to a new sample may be already selected and/or specified, such that both the new product sample dataset and the reference sample dataset information may be input into a machine learning model to determine whether there is a match. In other embodiments, only a new sample may be input, and the machine learning model may identify from a set of reference data whether there are any matches between the new sample and other stored reference datasets.

Other materials than plastics may also be analyzed and matched with reference samples in a similar way. For example, thermal scanning of materials, which may include, but not limited to, various alloys, ceramics, plastics, laminates, polymers, paints, fillers, resins, adhesives, complex materials/composites, minerals, rubbers, etc. may all be analyzed in accordance with the embodiments described herein. Such materials may be related to industries such as food, environment, pharmaceutical, petrochemical areas, etc. A Fourier Transform Infrared Spectroscopy (FT-IR), or IR, for example, may be used to generate datasets for determining matches between new product samples and previously analyzed product samples, or otherwise may identify functional groups in molecules present in various samples based on the infrared absorbance or transmittance spectra. Such analyses may be used to characterize known products as well as unknown materials.

TGA may also be used, and is an analytical technique used to determine a material's thermal stability and its fraction of volatile components by monitoring the weight change that occurs as a sample is heated at a constant rate. DSC may also be used, and is a thermodynamical tool for direct assessment of the heat energy uptake, which occurs in a sample within a regulated increase or decrease in temperature. DSC may particularly be applied to monitor the changes of phase transitions in a material. One or more of these analyses or other analyses may be used to assemble a fingerprint, or unique dataset of analyses results, for a given product. Subsequent sample datasets known to match the given product may then be used to train a machine learning model to determine whether a new sample conforms to a previously known sample, and therefore can be assumed to be made from the same or a substantially similar material. The embodiments described herein may be used to characterize known products as well as unknown materials and may be able to predict the performance of known products as well as unknown materials. Where multiple analyses are used, a final determination of whether a new sample matches a previously known product reference sample may be based on multiple comparisons by a machine learning model of datasets related to those multiple different types of analyses. The various embodiments herein represent a significant technical improvement over previous methods of product analyses. In particular, the accuracy of the actual determination of a match between product sample fingerprints and reference fingerprints is hereby improved. Improved consistency in results may also be achieved, as the trained machine learning models described herein may give better or more consistent results over time while comparing plastics fingerprints than manual reviewers, thereby reducing errors performing such comparisons, which can lead to additional testing being performed (e.g., performance testing of plastics) and quality control processes being implemented that otherwise would not have to be implemented with a more accurate and consistently accurate system as described herein.

FIG. 1 is a diagram illustrating a process 150 for testing and analyzing polymer samples, such as plastic samples. The process 150 specifically relates to how polymer samples, such as plastic samples may be received, tested, and analyzed. The analyzed data is then stored as a fingerprint representative of the sample, and new sample analyses may then be manually compared to the reference fingerprints to determine a match between a previously analyzed sample and a new sample.

At 152, an initial plastic sample, which may be a first reference sample, may be received, for example at a facility that performs product testing, analyzing, and/or certification. That initial sample may be, for example, a plastic sample that a manufacturer desires to be tested, analyzed, and/or certified. In various embodiments, the reference sample may include multiple product samples of the same type, so that different analyses and/or tests may be carried out on different samples. This may be useful where, for example, certain performance tests are destructive, and the same sample cannot be used for all tests as it will be destroyed during the process of performing one or more of the product tests. In various examples, the analyses shown in and described with respect to FIG. 1 may be performed along with other tests not shown. In various examples, some analyses and/or tests may also be omitted that are shown in FIG. 1 (e.g., if a sample of a type other than plastic is being analyzed). For example, the analyses and/or tests performed may be based on the type of product being analyzed, the type of certification desired, etc. Performance tests may be performed the initial plastic sample at 154. Performance tests may be performed, for example, if a certification of a sample is desired (e.g., at 162). However, in various embodiments, a certification may not be issued or desired, so the operation 154 may be omitted from the process 150. As described herein, those performance tests may then be omitted, for example when a subsequent sample is analyzed and compared to the reference sample and identified as being a match with the reference sample.

At 156, 158, 160, various analyses are performed on the reference sample received at 152. In particular, a thermogravimetric (TGA) analysis is performed at 156, an infrared spectroscopy (IR) analysis is performed at 158, and a differential scanning calorimetry (DSC) analysis may be performed at 160. The results of those three analyses may be saved as datasets that represent a fingerprint of the reference sample. Based on the tests and/or analyses performed on the sample (e.g., including performance tests), the sample may be certified at 162, and the analyses data may be saved as reference curves/datasets (e.g., a fingerprint) for later use. In a step not shown, a computing device of the organization performing the tests and/or analyses may send an electronic message to a computing device associated with the manufacturer that the certification and/or testing was successful, and the sample has been certified according to an applicable standard. In various embodiments, a sample may not be certified, but a sample may be analyzed and have its analysis data (e.g., fingerprint data) stored at 162 without certification (e.g., and without performing operation 154).

After the reference sample has been received, optionally tested, analyzed, and optionally certified at 152, 154, 156, 158, 160, and 162, a new sample and reference data may be received at 164. The receiving of a new sample at 164 may be remote in time from the receiving of the initial plastic sample at 152. In other words, the analysis data may be saved as fingerprint data at 162 and may be stored for some time before it is used to compare to analysis data collected for the new sample received at 164. For example, the manufacturer may desire to update a product or release a new version of a product that uses a material that is the same as or similar to the material already analyzed in the reference sample. As such, the manufacturer may send a new product sample or samples (e.g., plastic samples), and may also identify a previously analyzed and certified product to which the new product sample is believed to be similar. In this way, the new product sample may be analyzed, and those analysis results may be compared to the analysis results of the previously analyzed reference sample. In various embodiments, some tests performed on the reference sample, such as physical performance tests, may not be performed on the new product sample received. As described herein, those additional tests may be omitted if it is determined that the new product sample and the reference sample are matches (e.g., made from the same or substantially the same material). The identification of the reference sample purported to be the same as the new sample may, for example, include other information such as a source of the reference or new product sample (e.g., identity of manufacturer, country/city/region of origin, supplier of material for the manufacturer, etc.).

At 166, 168, and 170, the TGA, IR, and DSC analyses are performed on the new product sample. The outputs of these analyses may be a dataset and may be represented in various ways, such as a curve, table, comma-separated-values (CSV) file, etc. As described herein, these analysis results may also represent a fingerprint of the new sample. At 172, it is determined manually whether the new sample analysis results (e.g., the new sample fingerprint) match the reference sample analysis results (e.g., the reference fingerprint). In other words, a qualified chemist, for example, may compare the respective TGA, IR, and DSC results for the reference and new product samples to determine if the analysis results indicate a match (e.g., indicate that the reference and new product samples are made from the same or substantially the same material). If there is a match (e.g., the comparison passes), the new sample may be certified similarly to the reference sample. If there is not a match, the system may automatically generate and send a report to the manufacturer (or a computing device associated with the new product sample) that a match was not found with the new sample. The qualified chemist may also assemble such a report or communication, or may approve the sending of an automatically generated report/communication. In addition, the fingerprint of the reference may be stored along with the new sample fingerprint along with an indication that the reference and new sample fingerprints are a matched pair. Information that two fingerprints of analyzed samples are not a match may also be stored. In other words, a database or other type of data storage may contain the reference fingerprint data, the new sample fingerprint data, and information indicating whether the reference and new sample fingerprints are a match. In various embodiments as described herein, new samples may be matched to initial samples even if certification is not involved (e.g., in a process similar to the process 150 but omitting the operation 154 and the portion of operation 162 relating to certification).

Figure 2:
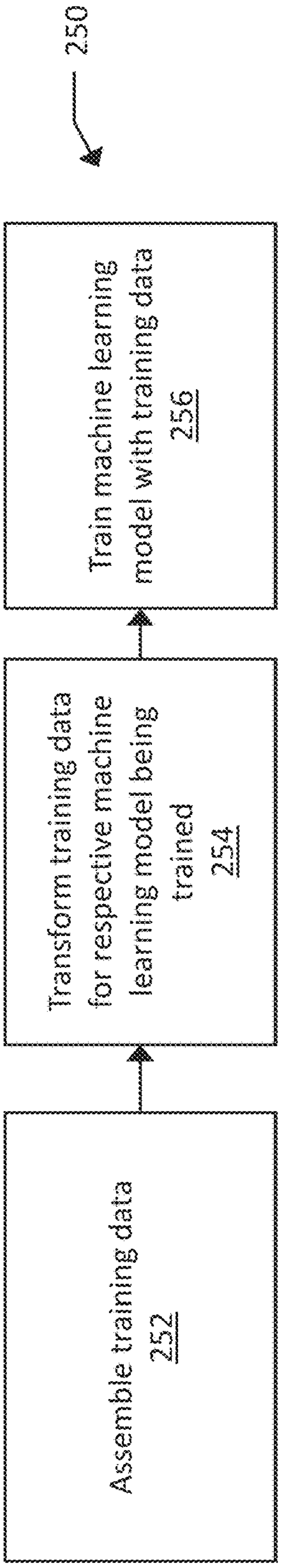
FIG. 2 is a diagram illustrating a process for training a machine learning model to determine matches for polymer samples, such as plastics samples, in accordance with one or more embodiments of the present disclosure.

FIG. 2 is a diagram illustrating a process 250 for training a machine learning model to determine matches for polymer or other product samples in accordance with one or more embodiments of the present disclosure. For example, a server computer system may use several machine learning algorithms and models to process data to determine data features for subsequent comparison of a sample of a material with a sample-reference. At 252, training data is assembled. As discussed further herein with respect to FIGS. 5-7, various types of machine learning algorithms and models may be trained according to the embodiments described herein, so different types of training data may be used for the different models and algorithms used. For example, training data for models or algorithms that recognize or extract features from a sample analysis curve/data may include just the analysis data (e.g., fingerprint curves from TGA, IR, and/or DSC analyses), and may also optionally include identification information of at least some of the features present in a curve identified manually. In another example, training data for models or algorithms that determine a match between different fingerprints (e.g., analyses data), may have training data including manually matched pairs of sample fingerprints, pairs of sample fingerprints that are manually identified to be non-matches, identification of features in fingerprint data (e.g., such features may be manually identified or identified using another machine learning model or algorithm), etc. This and other data or models may be used to train an untrained machine learning model at 154.

Figure 10:
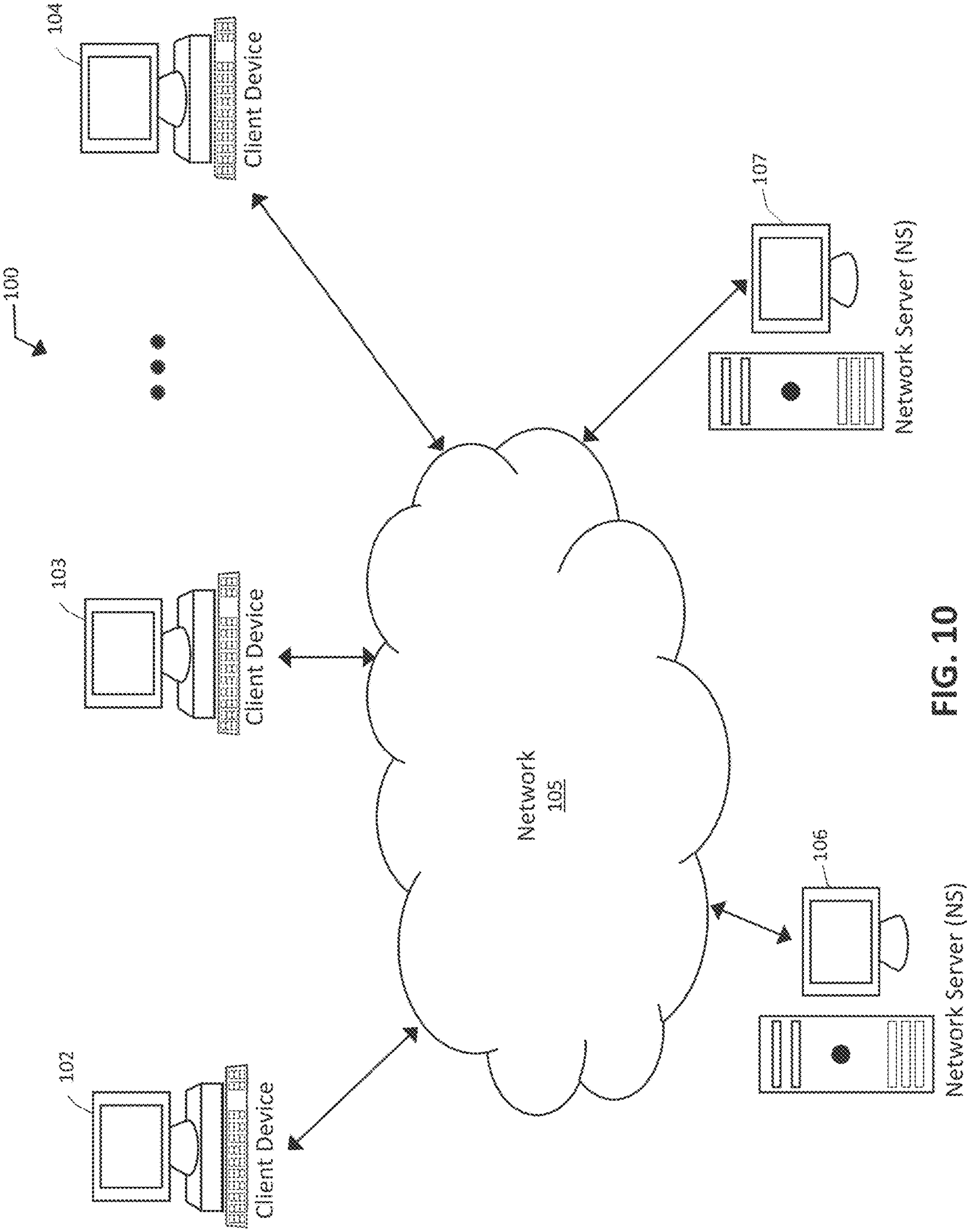
FIG. 10 is a block diagram depicting a computer-based system and platform in accordance with one or more embodiments of the present disclosure.
Figure 11:
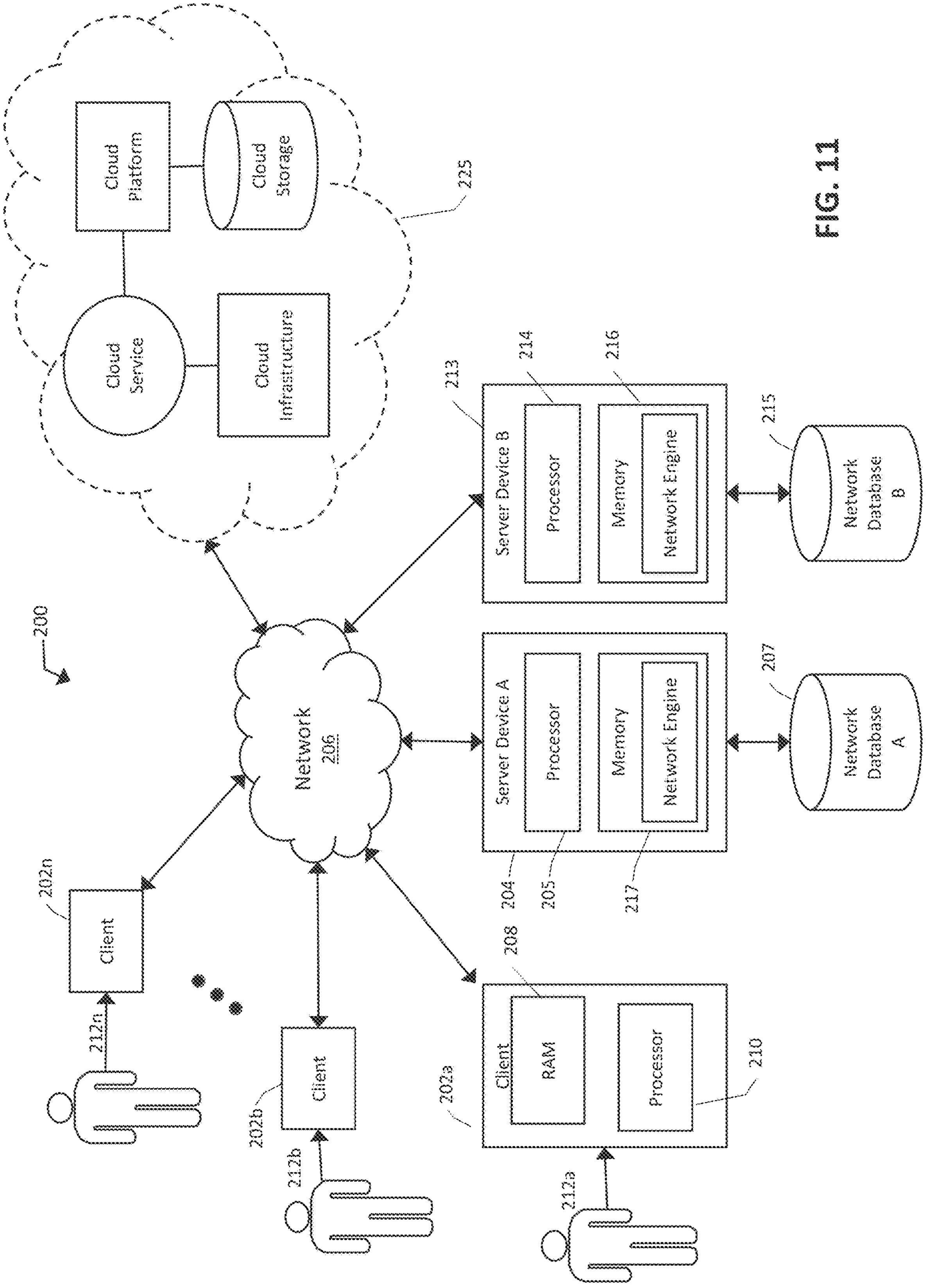
FIG. 11 is a block diagram depicting another computer-based system and platform in accordance with one or more embodiments of the present disclosure.

As described herein, a machine learning model may be stored on and trained using one or more of any of the computing components described herein (e.g., in a distributed computing environment), such as any of the components in FIGS. 10 and 11. While in various embodiments described herein datasets, analyses, fingerprints etc. may be referred to as matching, the datasets, analyses, fingerprints etc. may not be identical. Rather, the training data may indicate when similar data can be considered to be a match, such that a machine learning model may similarly be trained to determine a match between reference and sample data even when the data in the datasets, analyses, fingerprints etc. is not identical. In various embodiments, other terminology than matching may be used. For example, if a sample is determined to be substantially similar to a reference dataset, that sample may be referred to as a pass and/or as being a match. If the sample is not determined to be substantially similar, the sample may be referred to as a fail or as failing to match.

At 254, the training data is transformed for the respective machine learning model being trained. The training data may be formatted, cleaned up, cropped, etc. to make the data usable for purposes of training a machine learning model. In various embodiments, any type of pre-processing may be performed on the data assembled at 252.

For example, hexadecimal data may be converted to decimal data, noise filtering may be performed, scaling of the data may be performed, curve smoothing may be performed, curve data sampling and/or cropping may be performed to better align reference and sample curves in a matched pair, etc. In various embodiments, some or all of these pre-processing functions may be used. In various embodiments, additional types of pre-processing may also be performed. In addition, pre-processing may include a feature engineering step that detects and/or extracts features from analysis result data, so that features determined or extracted from the analysis data may be input into a machine learning model to train the machine learning model. In various embodiments, extracted features alone may be used to train a machine learning model, raw data alone may be used to train a machine learning model, or extracted features together with raw data may be used to train a machine learning model (e.g., where raw data is tagged to identify extracted features within the raw data). Feature identification/extraction may include one or more of curve derivation processes, segmentation processes, filtering, local minima and/or maxima identification, peaks/events detection and/or isolation, and/or targeted events determination.

In various embodiments, the training of a machine learning model may also involve splitting available training data into a set used for training and a set used for verification that trained model is working correctly. For example, 70% of available training data may be used to train a model, and the remaining 30% may be used after the model is trained to verify that the model is working correctly. Other possible percentage splits between training/verification data, other than the 70/30 already described, may include 90/10, 85/15, 80/20, 75/25, 65/35, 60/40, 55/45, or 50/50, in various examples. As such the training data may be a first portion of a total available training data, and a second portion of the total available training data may be used to verify a model after it is trained. In other words, a computing system may determine, using the trained machine learning model, whether sample datasets in the second portion of the total available training data match reference datasets in the second portion of the total available training data, the reference datasets of the plurality of pairs of datasets in the training data (e.g., the first portion of the total available training data), and/or the sample datasets of the plurality of pairs of datasets in the training data (e.g., the first portion of the total available training data). Then, the system may receive an input from a user via a user interface indicating whether matches for one or more of the sample datasets in the second portion of the total available training data match were successfully determined (e.g., receive user verification that the machine learning model is trained successfully). A machine learning model may be considered to be successfully trained if a predetermined percentage of the datasets used to confirm the model is working are successfully matched as verified by the user inputs.

At 256, the machine learning model is trained with the assembled and transformed training data. Once sufficient historical data is received and processed by the algorithmic methods and machine learning models at 256, patterns may be recognizable to be able to perform the matching between historical data (reference) and samples under scrutiny. Different types of machine learning models may be used in various embodiments, or combinations of different types of models may be used together as a machine learning model. A trained machine learning model may continue to be further trained and/or refined using additional usage data after it is used as a trained machine learning model, as further shown in and described with respect to FIG. 4. The trained machine learning model may then be used at 310 of FIG. 3 to compare new sample fingerprint data and a reference curve (e.g., fingerprint data of a previous sample) to determine if there is match (e.g., if the new sample fingerprint data and the reference fingerprint data have similar characteristics and therefore are likely to made out of a same material as described herein).

Figure 3:
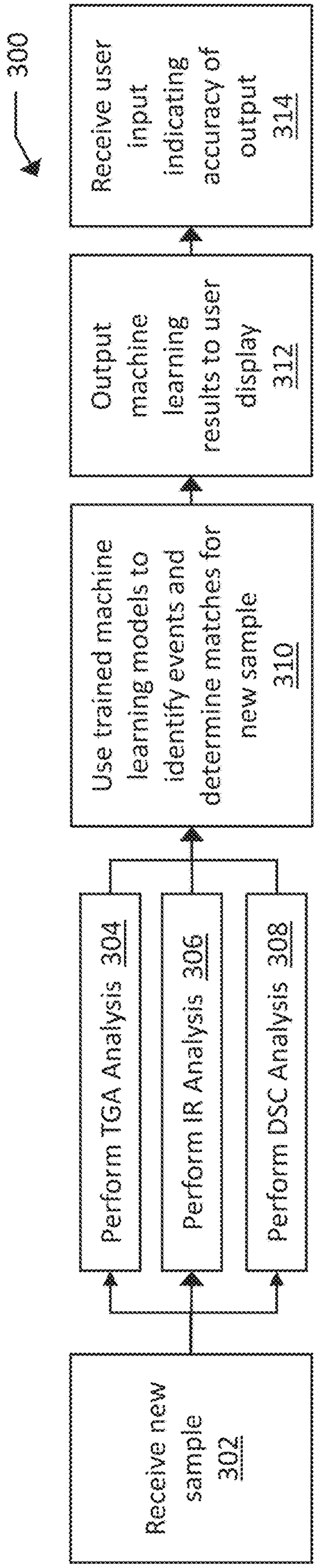
FIG. 3 is a diagram illustrating a process for analyzing a polymer sample, such as a plastic sample, and using a trained machine learning model to determine matches for a polymer/plastic sample in accordance with one or more embodiments of the present disclosure.

FIG. 3 is a diagram illustrating a process for analyzing a plastic sample and using a trained machine learning model to determine matches for a plastics sample in accordance with one or more embodiments of the present disclosure. At 302, a new sample is received.

In various embodiments, when a new sample is a received a reference sample that purportedly matches the new sample may or may not be identified. That is, there may be a known reference sample that is believed to be match for the new sample, or there may not be one provided. In other words, a new plastic sample may or may not have a known purported reference curve or fingerprint that the new sample should have similar data to. In such instances, a manufacturer or source of the new sample may not specify a previously analyzed product that the new sample is similar to. In such instances, a machine learning model may be trained to compare the new sample fingerprint data to multiple possible reference datasets and determine whether one of them is a match for, or substantially similar to, the new sample fingerprint data. In other words, the trained machine learning model may compare a new sample fingerprint to a concurrently input reference fingerprint when one is provided, or the trained machine learning model may compare a new sample fingerprint to a plurality of previously stored reference fingerprints to determine a match from, or whether it is substantially similar to one or multiples from the plurality of previously stored fingerprints. In the embodiments where a new sample fingerprint is compared to a plurality of previously stored reference fingerprints, the reference fingerprints may be fingerprints from the training data, may be other, previously input new sample fingerprints, or may be any other fingerprints stored in a server or database of other previously analyzed samples.

At 304, 306, and 308, the new sample may have TGA, IR, and DSC analyses performed on it in order to generate a fingerprint for the new sample. This fingerprint data, along with an identification of a purported matching reference sample fingerprint, may be transmitted to and received by one or more processors of one or more computing devices implementing the trained machine learning model(s). In other words, the new fingerprint data may be input into one or more trained machine learning model(s) and may be used at 310 to determine whether there is one or more matches for the new fingerprint data of the new product sample. For example, the trained machine learning model(s) may be used to determine whether the subsequent new product sample fingerprint data matches the purported reference fingerprint data for each of the TGA, IR, and DSC analyses, if a purported reference fingerprint is identified. As described herein, in other embodiments, no identification of a purportedly matching reference sample may be received, and therefore the machine learning model(s) may determine a match from a plurality of reference fingerprint datasets. In other words, the one or more processors implementing the trained machine learning model(s) may determine that the new sample dataset/fingerprint matches at least one of a new reference dataset (e.g., a reference dataset not previously analyzed by the machine learning model(s)), one of the reference datasets of the plurality of pairs of datasets in the training data used to train the machine learning model(s), one of the sample datasets of the plurality of pairs of datasets in the training data used to train the machine learning model(s), etc.

In instances where the new sample data set is determined to match, or be substantially similar to a reference dataset, that reference dataset may be retrieved, for example from a computer memory, server, database, etc. or otherwise received at or used by one or more processors implementing the machine learning model(s), even if that reference dataset has never been used or considered by the machine learning model before (e.g., the reference dataset was not part of the training data used to train the machine learning model). In other words, the machine learning model(s), once trained, may be able to determine matches between a new sample dataset/fingerprint and a reference dataset/fingerprint even if the machine learning model(s) has not seen or processed either of the sample dataset/fingerprint and/or reference dataset/fingerprint before.

As discussed herein with respect to FIGS. 5-7, a different machine learning model or set of machine learning models may be developed for each different analysis data that makes up a fingerprint (e.g., to be used at 310). The model (or inference engine) may be composed of one or more machine learning models with results combined via one or more algorithms. So, for the example of FIG. 3, three machine learning models may be trained, one for each of the TGA, IR, and DSC analyses. In this way, each machine learning model may be trained for recognizing matches of reference and new sample fingerprints for a specific type of analysis. Then, when trained machine learning models are used, each model may separately output whether a reference and new sample test result are a match. In such an example, a reference sample and a new product sample may not be considered a match unless all three models output that the fingerprints are a match for all three TGA, IR, and DSC analyses. In various other embodiments, a single machine learning model may be configured to receive multiple different types of analysis data for reference and new sample products (e.g., all of the TGA, IR, and DSC analysis data), and may output a single indication of whether reference and new sample products are a match. In such embodiments, the different analysis result data (e.g., TGA, IR, DSC analysis data) may be labeled such that the machine learning model may identify which data is associated with a particular analysis, which may assist in training a more accurate model, so that like analysis results of a reference and new product sample may be properly compared with one another. In various other embodiments, such analysis data may not be labeled and may be fed raw into a machine learning model to train it (and similarly unlabeled data may be used once the model is trained). The three machine learning models may further utilize results from other machine learning models, such as feature identification and/or extraction models, as further described with respect to FIGS. 5-7 herein. As such, in one example, six different machine learning models may be utilized in the process 300—one feature identification model and one conformity classifier model for each of the TGA, IR, and DSC aspects of a fingerprint.

At 312, the results of the machine learning model(s) analysis may be output to a user display. In this way, a user at the testing facility or associated with the testing facility may see whether there was a positive match or indication that the samples were substantially similar to one another. In various embodiments, the results may also be output or otherwise sent as a message to one or more computing devices, such as a computing device of the manufacturer of the reference sample and/or the subsequent new product sample being currently analyzed for a matching fingerprint. In other words, the results of an analysis may be transmitted to the manufacturer who sent the product for testing and/or certification (or for any other reason). In various embodiments, the subsequent new sample for which a match was identified by the machine learning model(s) may be certified by the entity running the product tests and/or analyses, since it is determined to be a match for a reference product sample. An application programming interface (API) may also be used to implement the methods described herein on a server or other computing system. As such, any computing device with access to the API may cause the methods described herein to be implemented. As such, any computing device with access to the API may also include the display to which results of the methods described herein are output.

An output from the trained machine learning model(s) at 312 may also include a confidence score (degree of matching between a new sample fingerprint and one or more reference fingerprints) and/or an explanation of the output. For example, the output results may include events or features extracted from the various analyses curves passed through one or more models, where the events or features match or mismatch between a new and reference fingerprints, data indicative of a degree to which events or features mismatch (e.g., difference in height, difference in position, etc.). A user display may also show results for different curve comparisons and associated data about each (e.g., each of the TGA, IR, and DSC curve comparisons).

At 314, a user may also optionally enter an input indicating whether the results of the machine learning model(s) are accurate. In some embodiments, this step may not be performed. In various embodiments, this step may be performed on all outputs where there is match determined, may be performed on a subset of all outputs from the machine learning model(s), or may not be performed on the outputs of the machine learning model(s). This input may be used to confirm whether the machine learning model(s) are accurately determining matches or not. That information on whether the outputs are correct or not may be used to refine or retrain a model (e.g., as shown in and described with respect to FIG. 4).

Figure 4:
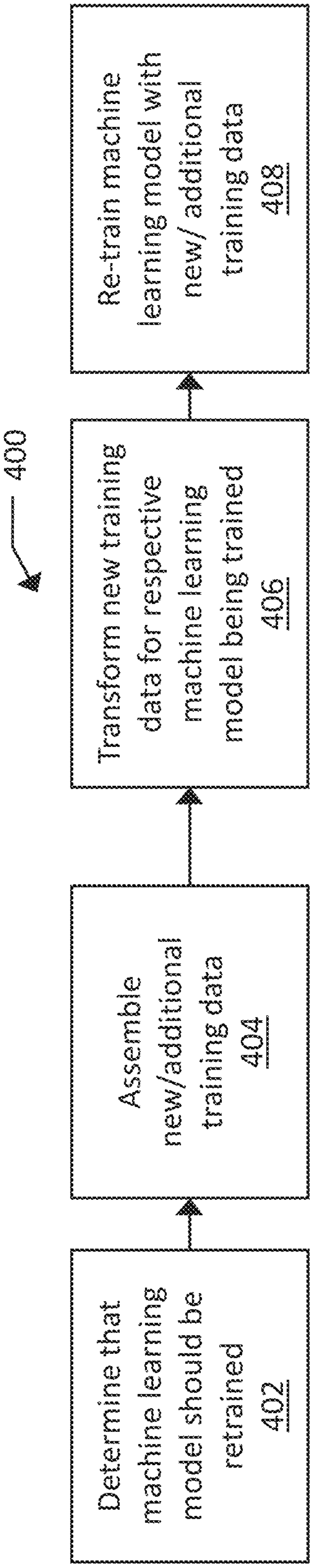
FIG. 4 is a diagram illustrating a process for retraining a machine learning model in accordance with one or more embodiments of the present disclosure.

FIG. 4 is a diagram illustrating a process 400 for retraining a machine learning model in accordance with one or more embodiments of the present disclosure. At 402, it may be determined that a machine learning model should be retrained. For example, if a predetermined threshold number or percentage of outputs are determined to be inaccurate based on user input (e.g., user inputs from 314 of FIG. 4), it may be determined that the machine learning model(s) should be retrained or refined as described herein. In various embodiments, the user input at 314 may also be used to make a final determination on whether a new product sample will actually be certified or not. In other examples, it may be determined that a model should be retrained or refined (i) when a certain level of drift is seen in the analysis results of any of the TGA, IR, and/or DSC tests, (ii) when a certain level of drift is seen in a model itself that is causing inaccurate results, and/or (iii) when types of plastic samples not previously analyzed are received (e.g., when data is received that is not representative of the training data originally used to train a model).

For example, an analysis machine may age and therefore produce different results over time. In another example, environmental factors may change in an analysis environment over time, which may also cause drift in analysis results. As such, this drift in analysis results may represent a change over time in the distribution of input data for a machine learning model, and original training data may not be representative of later in time analysis result data. In such instances, a trained model may provide inaccurate outputs, and it may be desirable to refine or retrain the model using updated or new training data. Such data drift may be detected by a time series analysis of data and a comparison of a probability density function for a recent sample of data against original training data. Such analysis may be performed automatically by a computing device to monitor for data drift as additional datasets are acquired via product analysis. In such embodiments, a computing device may output an alert message that drift may affect results of a machine learning model, and/or may automatically trigger a machine learning model to be retrained or refined using newer analysis data.

In another example, a trained model itself may drift overtime to eventually produce incorrect results. Concept or model drift may be a change in the statistical properties of the output variables (e.g., the prediction results). This may be due to changes in the external environment or in the real-world usage of the predictions, and may be detected by monitoring changes in the feedback received from users. If feedback indicates that a model is producing inaccurate results, training data may need to be re-labelled based the user feedback/inputs, or new training data may be used to retrain or refine a model. For instance, if user feedback directly contradicts a matched pair of datasets in training data, this may indicate concept drift that should be corrected.

At 404, new training data may be assembled, similar to 252 of FIG. 2. At 406, the new training data may be transformed, similar to 254 of FIG. 2. This assembled and transformed data may then be input into a trained machine learning model to refine the model and/or retrain it at 408. In some embodiments, a new, untrained model may be trained by the new training data, rather than retrain or refine an already trained model. A retrained machine learning model may be output and used (e.g., at 310 of FIG. 3), so that the model works according to the new, updated training data.

FIGS. 5A-5C are flowcharts illustrating processes for training and using machine learning models to determine matches between curves generated using a thermogravimetric (TGA) analysis for reference and new sample materials in accordance with one or more embodiments of the present disclosure. In FIG. 5A, historical TGA curves annotated with events or features are assembled at 502. At 504, those historical TGA curves annotated with events or features are used to train a machine learning model to detect events or features in TGA curves (e.g., in the results of a TGA analysis of a product sample). At 506, a trained TGA event detection model is output. As such, FIG. 5A relates to a process for training a machine learning model to detect events in TGA analysis results. As described herein, pre-processing and/or transformation of the data assembled at 502 may be performed prior to training the machine learning model at 504.

FIG. 5B relates to training a model to perform a comparison of two TGA curves to determine a match between the curves as described herein. At 508, historical DSC analysis curve pairs (e.g., reference datasets), which may include reference and sample curves, are received/assembled. Such data may also be transformed or pre-processed as described herein. The data assembled at 508 may be formatted or include data indicating pairs of curves that are matches or non-matches (e.g., reference and sample materials that have previously been manually determined to be matches or non-matches). At 510, a trained event detection models may be used to determine, identify, and/or extract features or events from the historical curves assembled at 508. The model 510 may be the trained event detection model from 506. In various embodiments, instead of a trained event detection model being used at 510, previously defined events/features may be input along with the TGA curve pairs, such as the annotated events of 502.

In any case, at 512, historical TGA curve pairs (including match or mismatch information for the curves) along with information about events/features identified in those curve pairs are thereby assembled at 512, for both reference and sample materials of each pair. At 514, a machine learning model is therefore trained using the historical TGA curve pairs (including match or mismatch data) as well as the event/feature annotations for those curves. At 516, a trained conformity classifier (e.g., a model that determines or classifies how closely one TGA curve conforms to another TGA curve) may be output. Such a model may be used at 310 of FIG. 3, for example.

In FIG. 5C, the conformity classifier model from 516 may be used to determine whether new sample data in a curve resulting from a TGA analysis of the new sample matches a reference TGA curve. The process of FIG. 5C may, for example, be used as the step 310 of FIG. 3. At 518, TGA curve data for a new sample and reference material may be assembled. As described herein, such data may be pre-processed before feeding it into any machine learning model. The data assembled at 518 may then be input into a TGA event detection model 520 (e.g., using the TGA event detection model from 506) to identify features/events in the reference and new sample TGA curves. Those features/events, along with the data assembled at 518 may then be assembled and/or pre-processed at 522 for both the reference and new samples. That information from 522 may then be input into a conformity classifier model 524 to output at 526 a conformity classification (e.g., do samples match or mismatch, degree of confidence in result, degree of matching or mismatching, etc.) and type and location of events/features detected in the TGA curves. Any output at 526 may be output to a user display, such as described with respect to step 312 of FIG. 3.

Figure 6A:
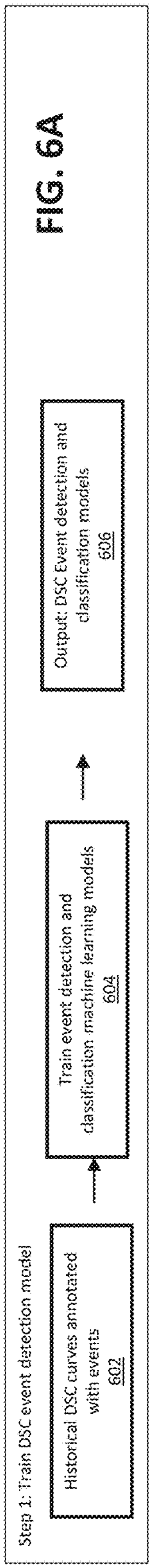
FIGS. 6A-6C are flowcharts illustrating processes for training and using machine learning models to determine matches between curves generated using a differential scanning calorimetry (DSC) analysis for reference and new sample materials in accordance with one or more embodiments of the present disclosure.
Figure 6B:
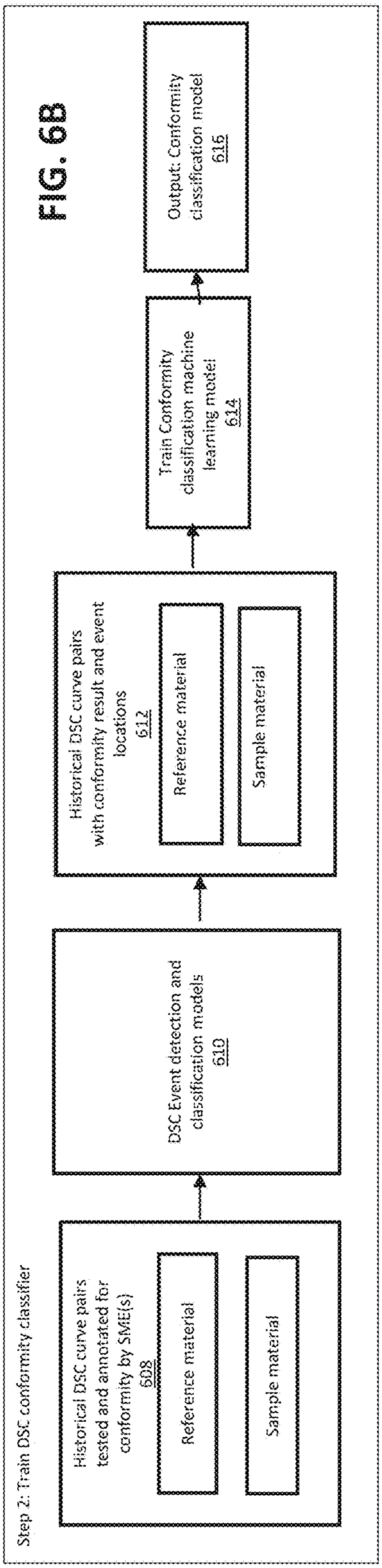
Figure 6C:
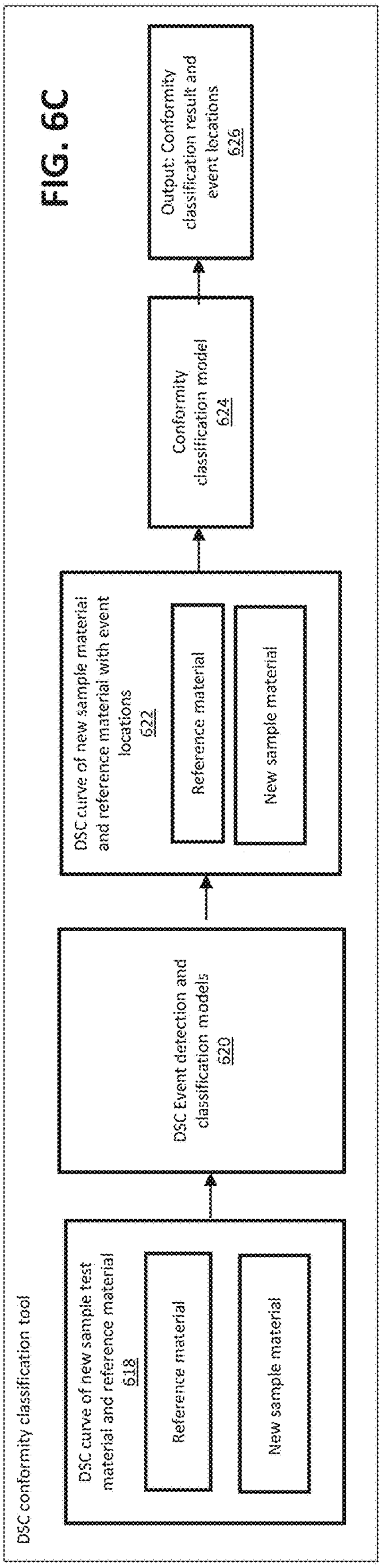

FIGS. 6A-6C are flowcharts illustrating processes for training and using machine learning models to determine matches between curves generated using a differential scanning calorimetry (DSC) analysis for reference and new sample materials in accordance with one or more embodiments of the present disclosure. In FIG. 6A, historical DSC curves annotated with events or features are assembled at 602. At 604, those historical DSC curves annotated with events or features are used to train a machine learning model to detect events or features in DSC curves (e.g., in the results of a DSC analysis of a product sample). At 604, the model may also be trained to classify the types of events/features detected as a certain type of feature/event. At 606, a trained DSC event detection model is output. As such, FIG. 6A relates to a process for training a machine learning model to detect events in DSC analysis results and classify those events. As described herein, pre-processing and/or transformation of the data assembled at 602 may be performed prior to training the machine learning model at 604.

FIG. 6B relates to training a model to perform a comparison of two DSC curves to determine a match between the curves as described herein. At 608, historical DSC analysis curve pairs (e.g., reference datasets), which include reference and sample curves, are received/assembled. Such data may also be transformed or pre-processed as described herein. The data assembled at 608 may be formatted or include data indicating pairs of curves that are matches or non-matches (e.g., reference and sample materials that have previously been manually determined to be matches or non-matches). At 610, a trained event detection models may be used to determine, identify, extract, and/or classify features or events from the historical curves assembled at 608. The model 610 may be the trained event detection model from 606. In various embodiments, instead of a trained event detection model being used at 610, previously defined events/features and their classifications may be input along with the DSC curve pairs, such as the annotated events of 602.

In any case, at 612, historical DSC curve pairs (including match or mismatch information for the curves) along with information about events/features identified in those curve pairs are thereby assembled at 612, for both reference and sample materials of each pair. At 614, a machine learning model is therefore trained using the historical DSC curve pairs (including match or mismatch data) as well as the event/feature annotations for those curves. At 616, a trained conformity classifier (e.g., a model that determines or classifies how closely one DSC curve conforms to another DSC curve) may be output. Such a model may be used at 310 of FIG. 3, for example.

In FIG. 6C, the conformity classifier model from 616 may be used to determine whether new sample data in a curve resulting from a DSC analysis of the new sample matches a reference DSC curve. The process of FIG. 6C may, for example, be used as the step 310 of FIG. 3. At 618, DSC curve data for a new sample and reference material may be assembled. As described herein, such data may be pre-processed before feeding it into any machine learning model. The data assembled at 618 may then be input into a DSC event detection and classifier model 620 (e.g., using the DSC event detection model from 606) to identify features/events in the reference and new sample DSC curves. Those features/events, along with the data assembled at 618 may then be assembled and/or pre-processed at 622 for both the reference and new samples. That information from 622 may then be input into a conformity classifier model 624 to output at 626 a conformity classification (e.g., do samples match or mismatch, degree of confidence in result, degree of matching or mismatching, etc.) and type and location of events/features detected in the DSC curves. Any output at 626 may be output to a user display, such as described with respect to step 312 of FIG. 3.

Figures 7A, 7B, 7C:
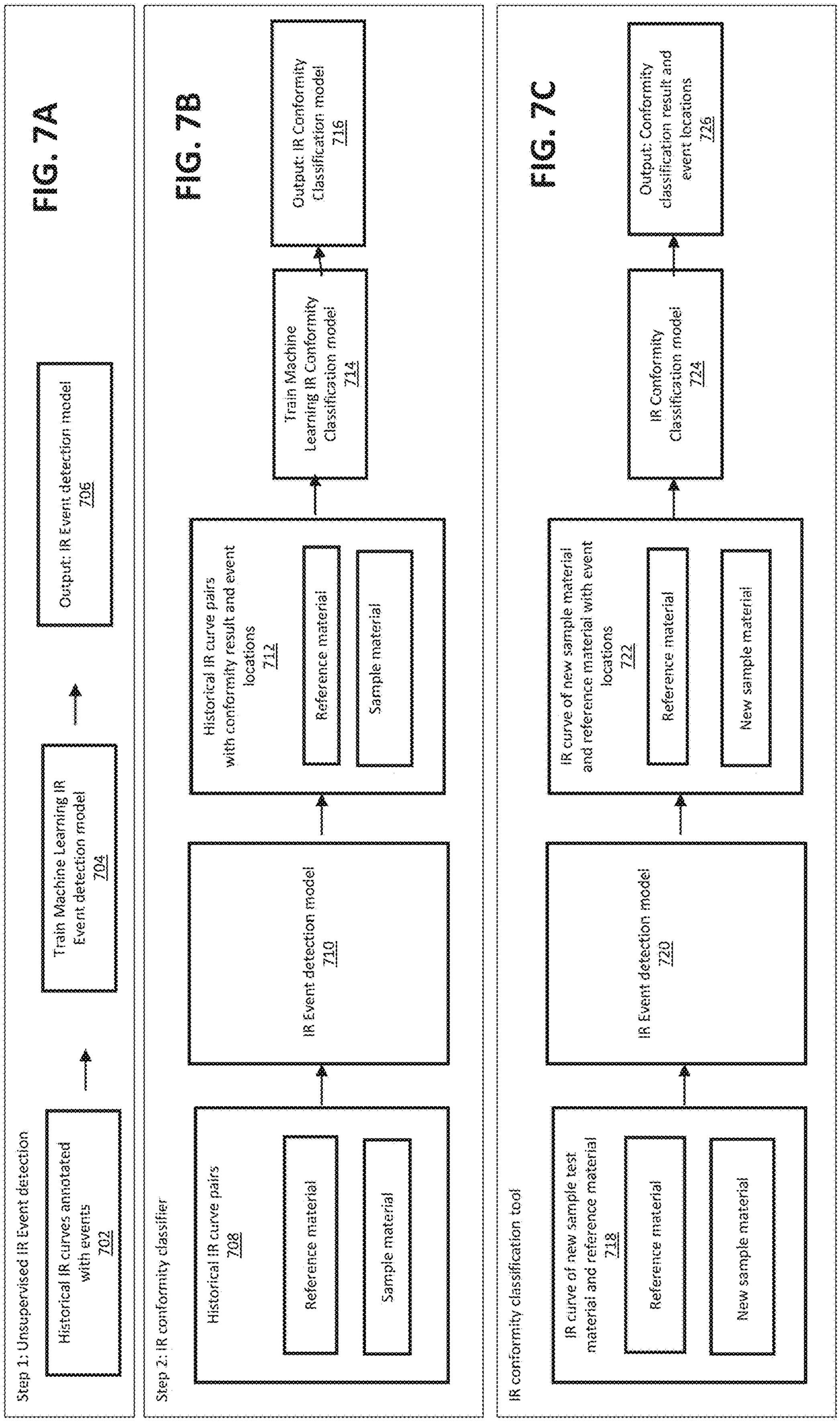
FIGS. 7A-7C are flowcharts illustrating processes for training and using machine learning models to determine matches between curves generated using an infrared spectroscopy (IR) analysis for reference and new sample materials in accordance with one or more embodiments of the present disclosure.

FIGS. 7A-7C are flowcharts illustrating processes for training and using machine learning models to determine matches between curves generated using an infrared spectroscopy (IR) analysis for reference and new sample materials in accordance with one or more embodiments of the present disclosure. In FIG. 7A, historical IR curves annotated with events or features are assembled at 702. At 704, those historical IR curves annotated with events or features are used to train a machine learning model to detect events or features in IR curves (e.g., in the results of a IR analysis of a product sample). At 706, a trained IR event detection model is output. As such, FIG. 7A relates to a process for training a machine learning model to detect events in IR analysis results. As described herein, pre-processing and/or transformation of the data assembled at 702 may be performed prior to training the machine learning model at 704.

FIG. 7B relates to training a model to perform a comparison of two IR curves to determine a match between the curves as described herein. At 708, historical DSC analysis curve pairs (e.g., reference datasets), which include reference and sample curves, are received/assembled. Such data may also be transformed or pre-processed as described herein. The data assembled at 508 may be formatted or include data indicating pairs of curves that are matches or non-matches (e.g., reference and sample materials that have previously been manually determined to be matches or non-matches). At 710, a trained event detection models may be used to determine, identify, and/or extract features or events from the historical curves assembled at 708. The model 710 may be the trained event detection model from 706. In various embodiments, instead of a trained event detection model being used at 710, previously defined events/features may be input along with the IR curve pairs, such as the annotated events of 702.

In any case, at 712, historical IR curve pairs (including match or mismatch information for the curves) along with information about events/features identified in those curve pairs are thereby assembled at 712, for both reference and sample materials of each pair. At 714, a machine learning model is therefore trained using the historical IR curve pairs (including match or mismatch data) as well as the event/feature annotations for those curves. At 716, a trained conformity classifier (e.g., a model that determines or classifies how closely one IR curve conforms to another IR curve) may be output. Such a model may be used at 310 of FIG. 3, for example.

In FIG. 7C, the conformity classifier model from 716 may be used to determine whether new sample data in a curve resulting from a IR analysis of the new sample matches a reference IR curve. The process of FIG. 7C may, for example, be used as the step 310 of FIG. 3. At 718, IR curve data for a new sample and reference material may be assembled. As described herein, such data may be pre-processed before feeding it into any machine learning model. The data assembled at 718 may then be input into a IR event detection model 720 (e.g., using the IR event detection model from 706) to identify features/events in the reference and new sample IR curves. Those features/events, along with the data assembled at 718 may then be assembled and/or pre-processed at 722 for both the reference and new samples. That information from 722 may then be input into a conformity classifier model 724 to output at 726 a conformity classification (e.g., do samples match or mismatch, degree of confidence in result, degree of matching or mismatching, etc.) and type and location of events/features detected in the IR curves. Any output at 726 may be output to a user display, such as described with respect to step 312 of FIG. 3.

Figure 8:
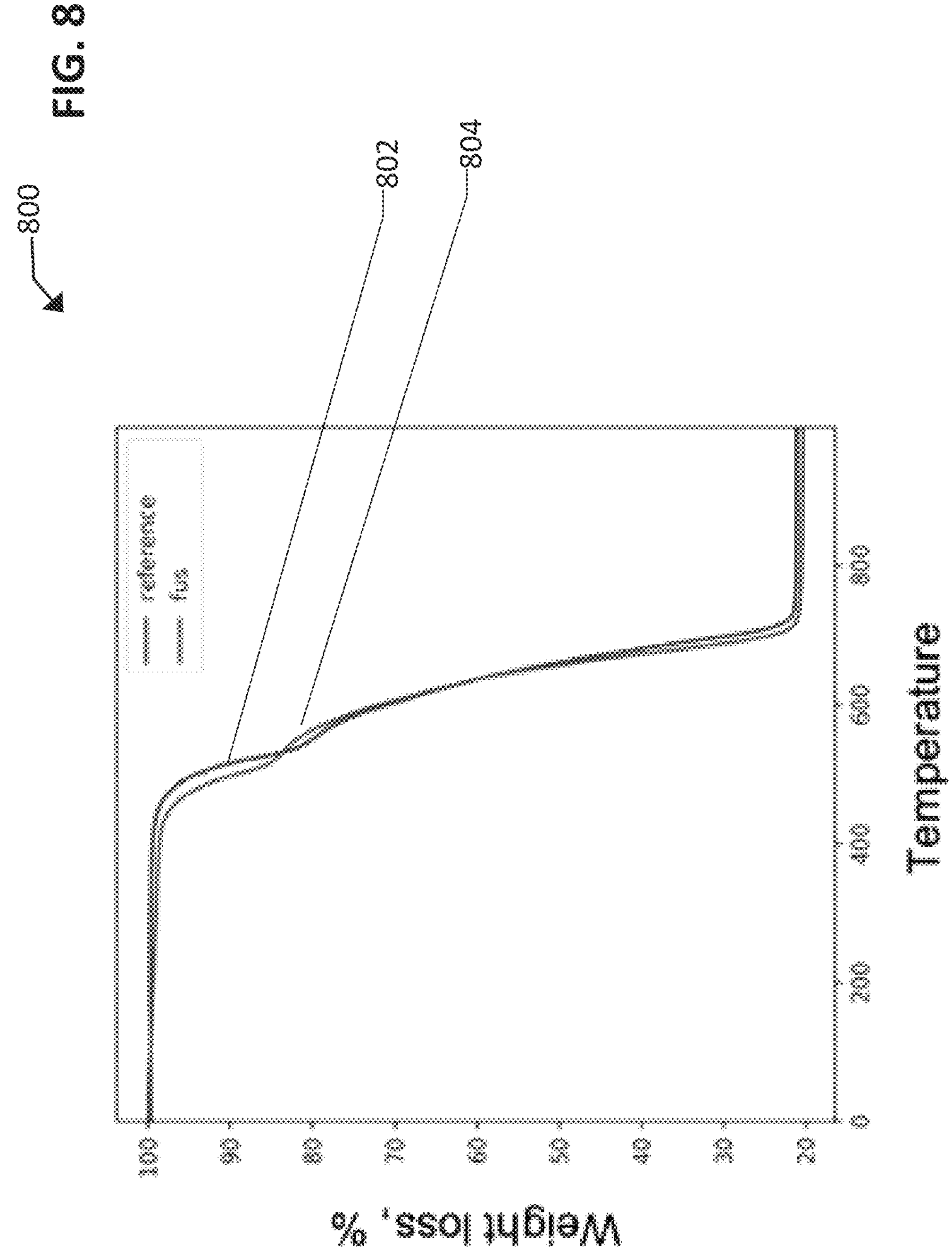
FIG. 8 is an example reference and new sample curve in accordance with one or more embodiments of the present disclosure.

FIG. 8 is an example of a reference curve 802 and sample curve 804 in accordance with one or more embodiments of the present disclosure. Such a curve may be displayed, for example, as a part of a user display as described herein. The example in FIG. 8 specifically shows an example curve representative of a TGA test, which shows the amount of weight loss of a sample when exposed to high temperature (e.g., the sample is being decomposed and melts, and may transform into ashes at the end of the test/curve).

Figure 9B:
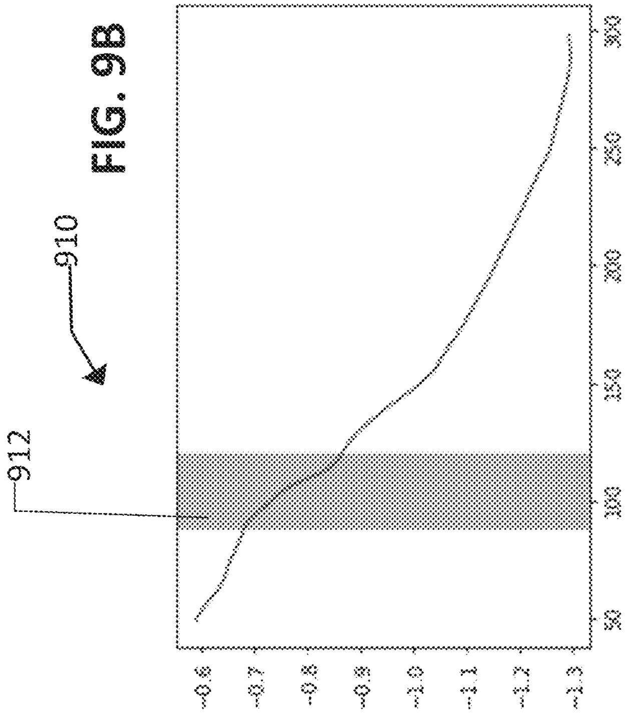
FIGS. 9A and 9B show examples of extracted events or features determined in a curve in accordance with one or more embodiments of the present disclosure.
Figure 9A:
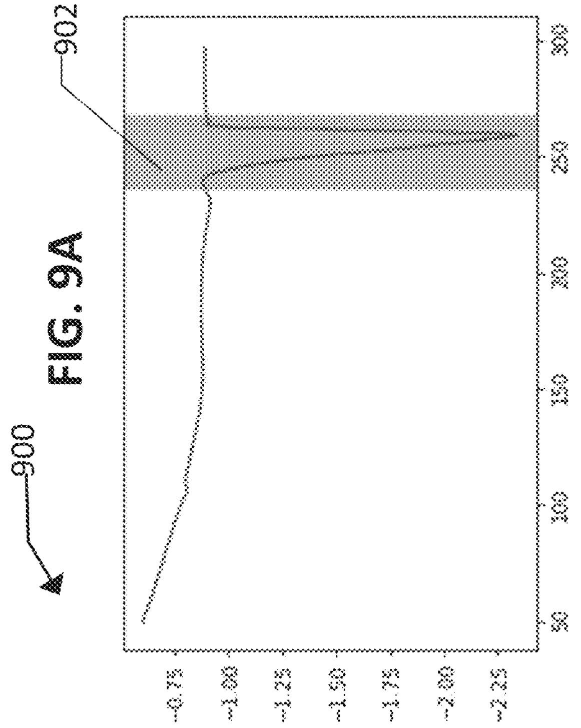

FIGS. 9A and 9B show example extracted events or features determined in a curve in accordance with one or more embodiments of the present disclosure. For example, FIG. 9A shows a curve 900 with a determined event 902, and FIG. 9B shows a curve 910 with a determined event 912. In various embodiments, the transformation or pre-processing of data for use in training a model may include removing noise from curves or otherwise isolating identified feature data. As such, noise may be removed or cropped from the datasets (e.g., portions of the curves 900 and/or 910 that do not include an identified feature or event). In various examples, a conformity classifier may determine a match for a (e.g., the curve 900 of FIG. 9A) if it has similar features or events (e.g., the determined event 902), and similarly a curve may match the curve 910 of FIG. 9B if it has a feature or event similar to the determined event 912. In various embodiments, multiple features or events may be identified in a curve or dataset, such that a match is determined when the multiple features events match between a sample and reference curve.

In various embodiments, a manufacturer themselves may also perform analyses that generate datasets to be analyzed using the methods described herein. For example, a manufacturer may perform TGA, IR, or DSC analyses on a new product sample that they would like to get compared to a previously tested, analyzed, and/or certified sample. The manufacturer may send those datasets to a computing device that implements the machine learning models (e.g., the certification/testing entity), so that the new product sample dataset may be compared to one or more previously analyzed reference datasets. As described herein, that manufacturer may also include an indication of a previously analyzed sample that is purportedly a match for, or substantially similar to, the new product sample. While the testing/certification entity may or may not use the analysis datasets sent by the manufacturer for final testing/certification, the manufacturer may, in any case, be able to get a preliminary result based on the output of the machine learning model indicating whether their new product sample would be a match with an existing reference dataset. In this way, a manufacturer can determine the likelihood of whether a new product will get certified on the basis of a previous certification, or if all new certification/testing may need to be performed on the new product (e.g., including performance tests that may take longer to complete than, for example, a subset of tests, such as IR, DSC, and/or TGA scans/analyses).

An example user interface for displaying results of a machine learning comparison between a new sample and a reference is also described herein. In such examples, data indicative of whether a match for the new sample dataset was identified may be sent to a display of a user computing device. An x-y graph may be displayed on the display that may include a reference curve representing a reference dataset for a particular type of analysis (e.g., TGA, DSC, IR) and a sample curve representing a sample dataset for a particular type of analysis (e.g., TGA, DSC, IR). In an example, a reference curve and sample curve may be overlaid on the same x-y graph displayed on a display, such as shown in FIG. 8. This may aid the user in ascertaining whether the analysis of the machine learning model is correct/accurate. Names for the respective curves may also be output to a display, as well as an indication of a confidence score, whether they are a match or fail, etc. A user display may also include one or more elements selectable by a user to indicate whether they agree with the output of the machine learning model indicated on the display, and optionally enter comments related to their assessment. Such inputs may be used as described herein, such as to further train or refine a model, or to determine that a model needs to be refined or retrained.

A user may also be able to select a portion of the user interface to decide which curve data (e.g., TGA, DSC, IR) is displayed. The user interface may also display data related to different identified features or events, the classifications of those features or events, etc., for different curves (e.g., reference or sample curves for any analysis). A button of the user interface may be selected to cause one or more of the conformity classifiers described herein to run a compare analysis on two curves, for example. The user interface may also allow a user to select a different reference curve to run a comparison against a new curve for one or more analyses (e.g., TGA, DSC, IR).

In various embodiments, different aspects are described with respect to FIGS. 10 and 11 that are described in further detail below. Any combination of the various computing components and aspects of FIGS. 10 and 11 may be used in the various embodiments described herein. For example, users may use any of client devices 102, 103, 104, or 202*a* through 202*n* to interact with computing resources or services as described herein, such as to cause a machine learning model to be trained, to input new sample datasets into a trained machine learning model to identify fingerprint matches, display aspects described herein on a display, etc. The client devices 102, 103, 104, or 202*a* through 202*n* may communicate with server devices 106, 107, 204, or 213; network databases 207 or 215; and/or one or more cloud components 225 through the networks 105 or 206. Any of the server devices 106, 107, 204, or 213; the network databases 207 or 215; and/or the one or more cloud components 225 may execute or implement the machine learning models or inference models as described herein to identify or determine matches or near matches between sample and reference datasets. In various embodiments, the client devices 102, 103, 104, or 202*a* through 202*n* may additionally or alternatively be used to implement or execute the methods or processes described herein. In any event, one or more of the computing devices, systems, etc. may be in communication with any or all of the other devices shown in FIGS. 10 and 11 to implement the systems and methods described herein. For example, an inference model and/or a machine learning model may be implemented/trained on one or more computing devices (e.g., the server devices 106, 107, 204, or 213; the network databases 207 or 215; could components 225), and the machine learning or inference models as described herein may be implemented, stored, retrieved, and/or processed by any of the computing devices and/or the cloud components described herein. The components shown in FIGS. 10 and 11 are described in greater detail below.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein, and/or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

FIG. 10 is a block diagram depicting a computer-based system and platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 100 may be configured to manage a large number of members and/or concurrent transactions, as detailed herein. In some embodiments, the exemplary computer-based system/platform 100 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 10, members 102-104 (e.g., clients) of the exemplary computer-based system/platform 100 may include virtually any computing device capable of receiving and sending a message over a network (e.g., cloud network), such as network 105, to and from another computing device, such as servers 106 and 107, each other, and the like. In some embodiments, the member devices 102-104 may be personal computers, multiprocessor systems, microprocessor-based or programmable consumer electronics, network PCs, and the like. In some embodiments, one or more member devices within member devices 102-104 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 102-104 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 102-104 may include may run one or more applications, such as Internet browsers, mobile applications, voice calls, video games, videoconferencing, and email, among others. In some embodiments, one or more member devices within member devices 102-104 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 102-104 may be specifically programmed by either Java, .Net, QT, C, C++ and/or other suitable programming language. In some embodiments, one or more member devices within member devices 102-104 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 105 may provide network access, data transport and/or other services to any computing device coupled to it. In some embodiments, the exemplary network 105 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 105 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 105 may include and implement, as an alternative or in conjunction with one or more of the above, a WiMAX architecture defined by the WiMAX forum. In some embodiments and, optionally, in combination of any embodiment described above or below, the exemplary network 105 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 105 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 105 may also include mass storage, such as network attached storage (NAS), a storage area network (SAN), a content delivery network (CDN) or other forms of computer or machine readable media.

In some embodiments, the exemplary server 106 or the exemplary server 107 may be a web server (or a series of servers) running a network operating system, examples of which may include but are not limited to Microsoft Windows Server, Novell NetWare, or Linux. In some embodiments, the exemplary server 106 or the exemplary server 107 may be used for and/or provide cloud and/or network computing. Although not shown in FIG. 10, in some embodiments, the exemplary server 106 or the exemplary server 107 may have connections to external systems like email, SMS messaging, text messaging, ad content providers, etc. Any of the features of the exemplary server 106 may be also implemented in the exemplary server 107 and vice versa.

In some embodiments, one or more of the exemplary servers 106 and 107 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 101-104.

In some embodiments and, optionally, in combination of any embodiment described above or below, for example, one or more exemplary computing member devices 102-104, the exemplary server 106, and/or the exemplary server 107 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (TRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

FIG. 11 depicts a block diagram of another exemplary computer-based system/platform 200 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 202*a*, 202*b* through 202*n* shown each at least includes a computer-readable medium, such as a random-access memory (RAM) 208 coupled to a processor 210 or FLASH memory. In some embodiments, the processor 210 may execute computer-executable program instructions stored in memory 208. In some embodiments, the processor 210 may include a microprocessor, an ASIC, and/or a state machine. In some embodiments, the processor 210 may include, or may be in communication with, media, for example computer-readable media, which stores instructions that, when executed by the processor 210, may cause the processor 210 to perform one or more steps described herein. In some embodiments, examples of computer-readable media may include, but are not limited to, an electronic, optical, magnetic, or other storage or transmission device capable of providing a processor, such as the processor 210 of client 202*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 202*a* through 202*n* may also comprise a number of external or internal devices such as a mouse, a CD-ROM, DVD, a physical or virtual keyboard, a display, or other input or output devices. In some embodiments, examples of member computing devices 202*a* through 202*n* (e.g., clients) may be any type of processor-based platforms that are connected to a network 206 such as, without limitation, personal computers, digital assistants, personal digital assistants, smart phones, pagers, digital tablets, laptop computers, Internet appliances, and other processor-based devices. In some embodiments, member computing devices 202*a* through 202*n* may be specifically programmed with one or more application programs in accordance with one or more principles/methodologies detailed herein. In some embodiments, member computing devices 202*a* through 202*n* may operate on any operating system capable of supporting a browser or browser-enabled application, such as Microsoft™, Windows™, and/or Linux. In some embodiments, member computing devices 202*a* through 202*n* shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 202*a* through 202*n*, users 212*a* through 212*n*, may communicate over the exemplary network 206 with each other and/or with other systems and/or devices coupled to the network 206. As shown in FIG. 11, exemplary server devices 204 and 213 may be also coupled to the network 206. In some embodiments, one or more member computing devices 202*a* through 202*n* may be mobile clients.

In some embodiments, at least one database of exemplary databases 207 and 215 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

As also shown in FIG. 11, some embodiments of the disclosed technology may also include and/or involve one or more cloud components 225, which are shown grouped together in the drawing for sake of illustration, though may be distributed in various ways as known in the art. Cloud components 225 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

According to some embodiments, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS), platform as a service (PaaS), and/or software as a service (SaaS).

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components and cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux™, (2) Microsoft Windows™, (3) OS X (Mac OS), (4) Solaris™, (5) UNIX™ (6) VMWare™, (7) Android™, (8) Java Platforms™, (9) Open Web Platform, (10) Kubernetes or other suitable computer platforms. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIP-EMD-160, RTR0, SHA-1, SHA-2, Tiger (TTH), WHIRL-POOL, RNGs).

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A method comprising:

receiving, by one or more processors of one or more computing devices, training data for training of a machine learning model, wherein the training data is a first portion of a total available training data and wherein the training data comprises:

a plurality of pairs of datasets, wherein each of the pairs of datasets comprises a reference dataset and a sample dataset, and wherein:

the reference dataset is indicative of first results of a first polymer sample analysis, and the sample dataset is indicative of second results of a second polymer sample analysis; and an indication, for each of the pairs of datasets, that features of the sample dataset and the reference dataset are a match;

training, by the one or more processors, the machine learning model based on the training data to determine matches between datasets;

receiving, by the one or more processors, a new sample dataset;

determining, by the one or more processors using the trained machine learning model, that the new sample dataset matches at least one of one or more new reference datasets, the reference dataset of one of the plurality of pairs of datasets in the training data, or the sample dataset of one of the plurality of pairs of datasets in the training data;

receiving, by the one or more processors, a second portion of the total available training data; and determining, by the one or more processors using the trained machine learning model, whether sample datasets in the second portion of the total available training data match any of reference datasets in the second portion of the total available training data, the reference dataset of one of the plurality of pairs of datasets in the training data, or the sample dataset of one of the plurality of pairs of datasets in the training data.

2. The method of claim 1, further comprising, in response to the new sample dataset being determined to match the new reference dataset, receiving, by the one or more processors, the new reference dataset.

3. The method of claim 1, wherein the new sample dataset is indicative of third results of a third polymer sample analysis.

4. The method of claim 3, wherein the first polymer sample analysis, the second polymer sample analysis, and the third polymer sample analysis are each a same type of polymer sample analysis.

5. The method of claim 4, wherein the same type of polymer sample analysis is at least one of an infrared spectroscopy analysis, a thermogravimetric analysis, or a differential scanning calorimetry analysis.

6. The method of claim 1, further comprising pre-processing the training data prior to training the machine learning model.

7. The method of claim 6, wherein the pre-processing comprises extracting features from the plurality of pairs of datasets.

8. The method of claim 6, wherein the pre-processing comprises at least one of smoothing curves represented in the plurality of pairs of datasets, removing portions of the plurality of pairs of datasets in which events were not detected, or scaling of the plurality of pairs of datasets.

9. The method of claim 1, further comprising receiving, by the one or more processors, an input from a user via a user interface, wherein the input indicates whether matches for one or more of the sample datasets in the second portion of the total available training data match were successfully determined.

10. The method of claim 1, further comprising sending, by the one or more processors, to a display of a user computing device, data indicative of whether a match for the new sample dataset was identified.

11. The method of claim 10, wherein the data sent to the display further comprises: curve data configured to cause the display to show a representation of:

a first curve representative of the new sample dataset, and a second curve representative of a dataset determined to match the new sample dataset.

12. A system comprising:

a memory;

a display; and at least one processor coupled to the memory, the at least one processor configured to:

store, on the memory, a trained machine learning model, wherein:

the trained machine learning model was trained with training data comprising:

a plurality of pairs of datasets, wherein each of the pairs of datasets comprises a reference dataset and a sample dataset, and wherein:

the reference dataset is indicative of first results of a first plastic sample analysis, and the sample dataset is indicative of second results of a second plastic sample analysis; and an indication, for each of the pairs of datasets, that features of the sample dataset and the reference dataset are a match;

receive a new sample dataset;

determine, based on the trained machine learning model, that the new sample dataset matches at least one of one or more new reference datasets, the reference dataset of one of the plurality of pairs of datasets in the training data, or the sample dataset of one of the plurality of pairs of datasets in the training data; and send to the display data indicative of whether a match for the new sample dataset was identified, wherein the data sent to the display further comprises curve data configured to cause the display to show a representation of:

a first curve representative of the new sample dataset, and a second curve representative of a dataset determined to match the new sample dataset.

13. The system of claim 12, wherein the first curve and the second curve are overlaid on a same x-y graph displayed on the display.

14. The system of claim 12, wherein the processor is further configured to receive an input from a user via a user interface, wherein the input indicates whether the determination of a match for the new sample dataset is accurate.

15. The system of claim 12, wherein the training data is a first portion of total available training data, and further wherein the at least one processor is configured to:

receive a second portion of the total available training data; and determine, using the trained machine learning model, whether sample datasets in the second portion of the total available training data match any of reference datasets in the second portion of the total available training data, the reference dataset of one of the plurality of pairs of datasets in the training data, or the sample dataset of one of the plurality of pairs of datasets in the training data.

16. A non-transitory computer readable medium having instructions stored thereon that, upon execution by a computing device, cause the computing device to perform operations comprising:

receiving a dataset, wherein the dataset is a first portion of a total available dataset and wherein the dataset comprises:

a plurality of data pairs, wherein each of the data pairs comprises reference data and sample data, and wherein:

the reference data is indicative of first results of a first plastic sample analysis, and the sample data is indicative of second results of a second plastic sample analysis; and an indication, for each of the data pairs, that features of the sample data and the reference data are a match;

training a machine learning model using the dataset;

receiving new sample data; and determining, using the trained machine learning model, that the new sample data matches at least one of new reference data, the reference data of one of the plurality of data pairs in the dataset, or the sample data of one of the plurality of data pairs in the dataset;

receiving a second portion of the total available dataset; and determining, using the trained machine learning model, whether sample data in the second portion of the total available dataset match any of reference data in the second portion of the total available dataset, the reference data of one of the plurality of data pairs in the dataset, or the sample data of one of the plurality of data pairs in the dataset.

17. The non-transitory computer readable medium of claim 16, wherein the first plastic sample analysis is at least one of an infrared spectroscopy analysis, a thermogravimetric analysis, or a differential scanning calorimetry analysis.

18. The non-transitory computer readable medium of claim 16, wherein the first plastic sample analysis and the second plastic sample analysis are a same type of analysis.

19. The non-transitory computer readable medium of claim 16, wherein the instructions further cause the computing device to send, to a display, data indicative of whether a match for the new sample data was identified, wherein the data sent to the display further comprises curve data configured to cause the display to show a representation of:

a first curve representative of the new sample data, and a second curve representative of a dataset determined to match the new sample data.

* * * * *